(12) United States Patent
Lee et al.

(10) Patent No.: US 11,092,729 B2
(45) Date of Patent: Aug. 17, 2021

(54) POLARIZING PLATE AND LIQUID CRYSTAL DISPLAY DEVICE COMPRISING SAME

(71) Applicant: LG CHEM, LTD., Seoul (KR)

(72) Inventors: Byung Sun Lee, Daejeon (KR); Kyun Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/638,431

(22) PCT Filed: Nov. 13, 2018

(86) PCT No.: PCT/KR2018/013830
§ 371 (c)(1),
(2) Date: Feb. 11, 2020

(87) PCT Pub. No.: WO2019/132241
PCT Pub. Date: Jul. 4, 2019

(65) Prior Publication Data
US 2020/0209449 A1   Jul. 2, 2020

(30) Foreign Application Priority Data

Dec. 26, 2017 (KR) ........................ 10-2017-0179581

(51) Int. Cl.
*G02F 1/1335* (2006.01)
*G02B 5/30* (2006.01)
*G02B 1/14* (2015.01)

(52) U.S. Cl.
CPC ............. *G02B 5/3016* (2013.01); *G02B 1/14* (2015.01); *G02F 1/133528* (2013.01); *G02F 1/133545* (2021.01)

(58) Field of Classification Search
CPC ............. G02F 1/133528; G02F 1/1335; G02F 2001/133531; G02F 2001/133545; G02F 1/13363; G02F 1/1333; G02F 1/133531; G02F 2413/12; G02F 1/133545; G02F 1/133507; G02F 1/13356; G02B 1/14; G02B 5/30; G02B 5/3016; G02B 5/3083; B32B 27/20; B32B 27/30
See application file for complete search history.

(56) References Cited

U.S. PATENT DOCUMENTS

| 2004/0085496 A1 | 5/2004 | Paukshto et al. |
| 2005/0180017 A1 | 8/2005 | Hara et al. |
| 2007/0188686 A1 | 8/2007 | Yano et al. |

(Continued)

FOREIGN PATENT DOCUMENTS

| CN | 1954252 A | 4/2007 |
| CN | 101099105 A | 1/2008 |

(Continued)

*Primary Examiner* — Thoi V Duong
(74) *Attorney, Agent, or Firm* — Dentons US LLP

(57) ABSTRACT

The present application relates to a stacked polarizing plate comprising: a polyvinyl alcohol-based polarizer having one or more of iodine and a dichroic dye; and a film provided on one surface of the polyvinyl alcohol-based polarizing plate and comprising a lyotropic liquid crystal compound which absorbs light having a wavelength of 380 nm to 780 nm, and a liquid crystal display device comprising the same.

7 Claims, 7 Drawing Sheets

(56) References Cited

U.S. PATENT DOCUMENTS

| | | | |
|---|---|---|---|
| 2010/0002171 A1* | 1/2010 | Yoshimi | G02F 1/133528 |
| | | | 349/96 |
| 2010/0165265 A1* | 7/2010 | Moon | G02F 1/133634 |
| | | | 349/96 |
| 2011/0272629 A1 | 11/2011 | Shin et al. | |
| 2012/0075568 A1 | 3/2012 | Chang et al. | |
| 2012/0154718 A1 | 6/2012 | Bae et al. | |
| 2013/0344577 A1 | 12/2013 | Kilickiran et al. | |
| 2015/0362647 A1* | 12/2015 | Tanimoto | H01L 41/193 |
| | | | 428/413 |
| 2016/0033693 A1* | 2/2016 | Son | G02B 5/3033 |
| | | | 359/487.02 |
| 2017/0285236 A1 | 10/2017 | Ryu et al. | |

FOREIGN PATENT DOCUMENTS

| | | |
|---|---|---|
| CN | 102540559 A | 7/2012 |
| CN | 103026274 A | 4/2013 |
| JP | 2002-296415 A | 10/2002 |
| JP | 2004-4764 A | 1/2004 |
| JP | 2007-241037 A | 9/2007 |
| JP | 2008-031133 A | 2/2008 |
| JP | 2012-507619 A | 3/2012 |
| KR | 10-2008-0016502 A | 2/2008 |
| KR | 10-0835156 B1 | 6/2008 |
| KR | 10-2010-0046015 A | 5/2010 |
| KR | 10-2012-0010212 A | 2/2012 |
| KR | 10-2012-0070339 A | 6/2012 |
| KR | 10-2015-0038835 A | 4/2015 |
| KR | 10-2016-0038202 A | 4/2016 |
| KR | 10-2016-0038383 A | 4/2016 |

\* cited by examiner

[Figure 1]
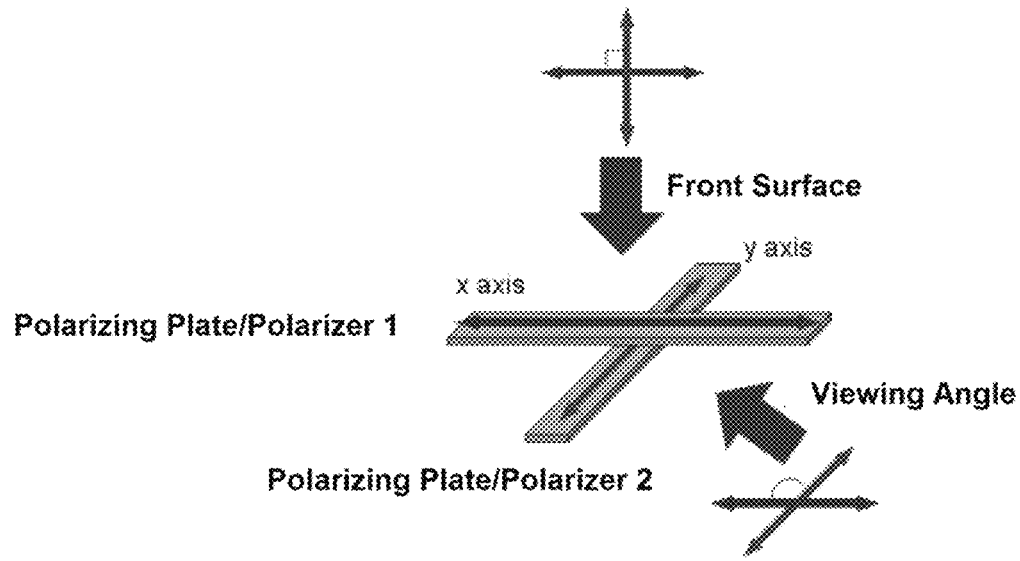
[Figure 2]
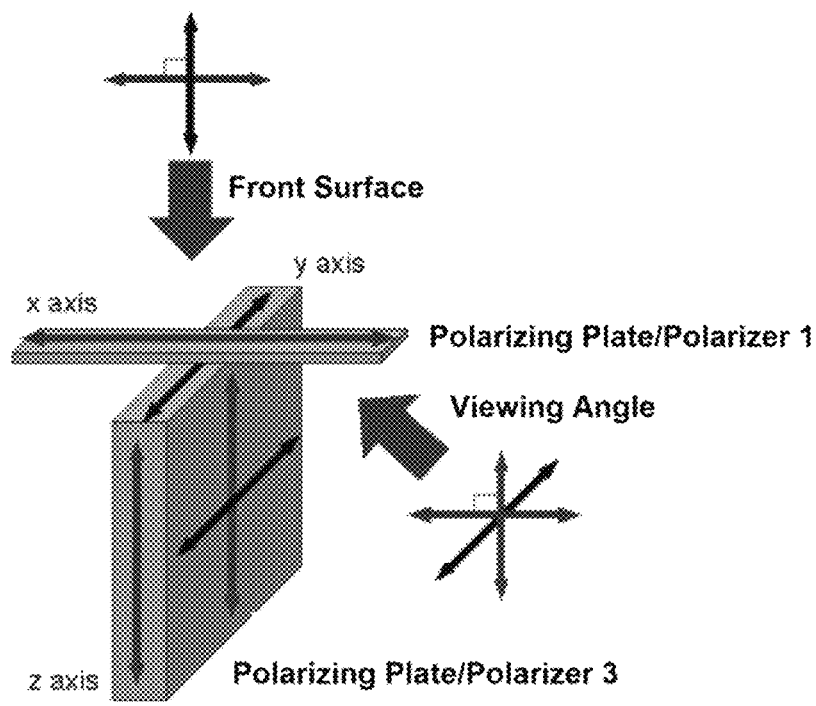

[Figure 3]
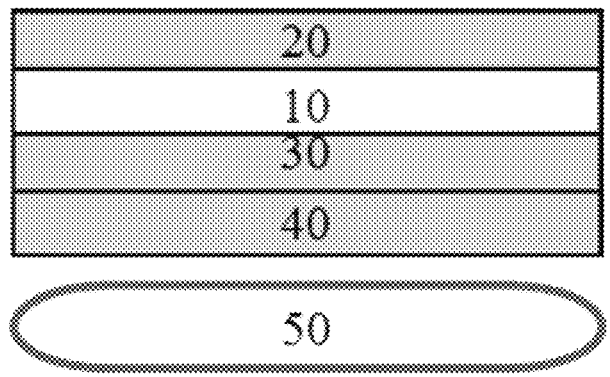
[Figure 4]
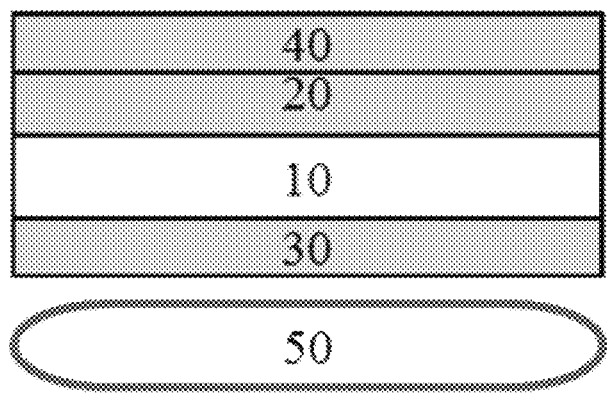
[Figure 5]
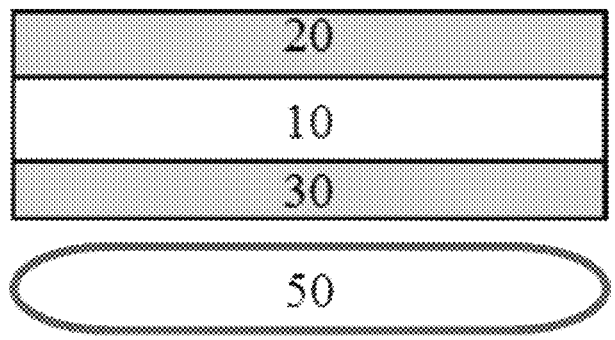

[Figure 6]
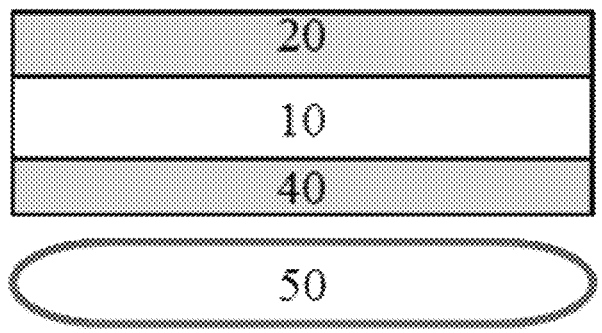
[Figure 7]
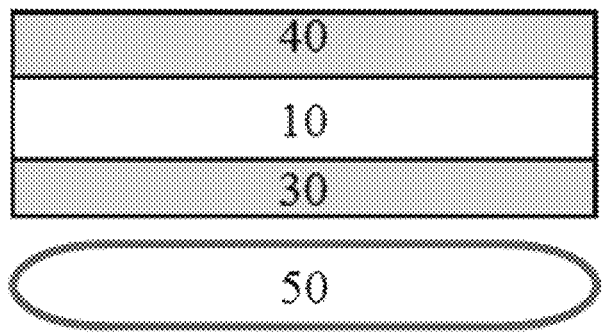
[Figure 8]
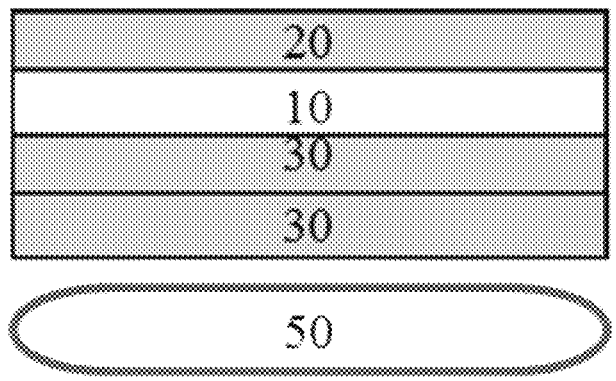

[Figure 9]
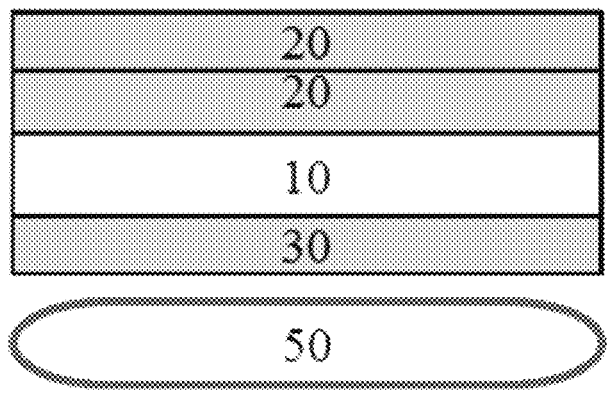
[Figure 10]
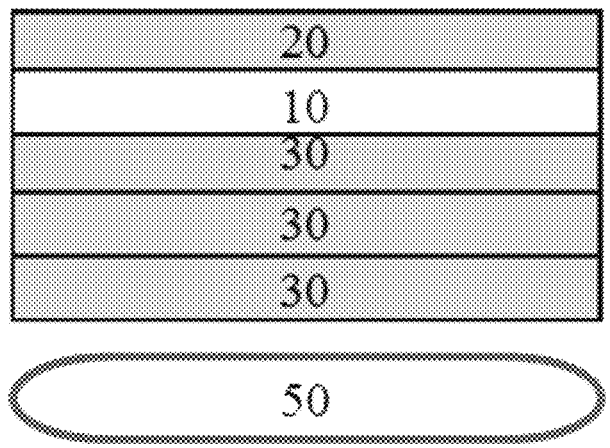

[Figure 11]
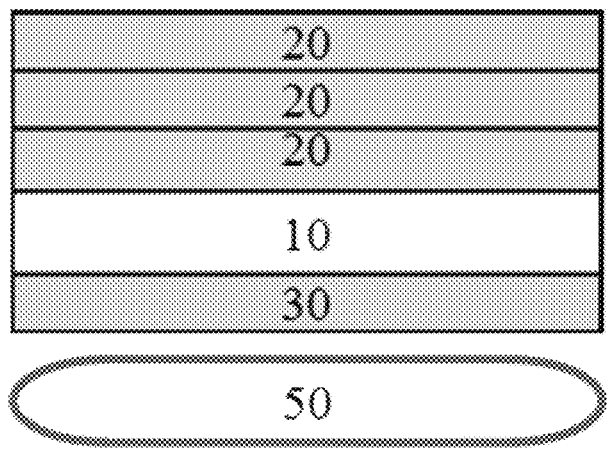
[Figure 12]
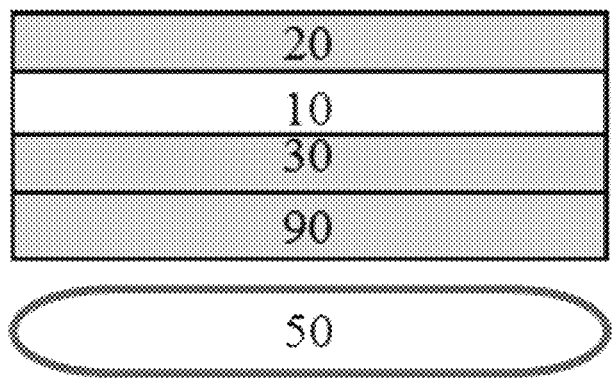
[Figure 13]
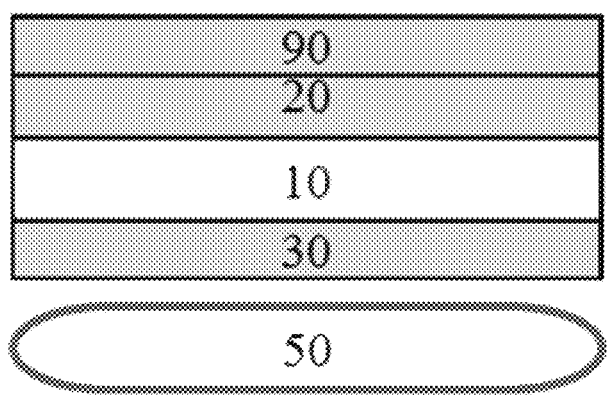

[Figure 14]
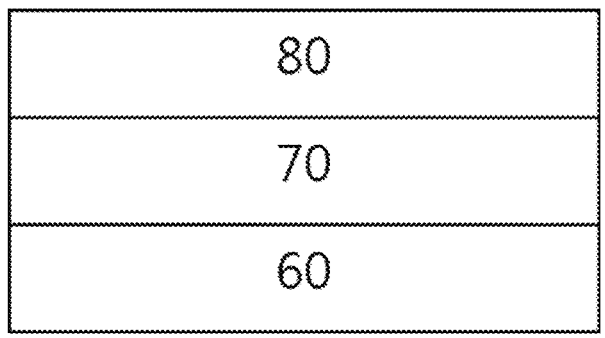
[Figure 15]
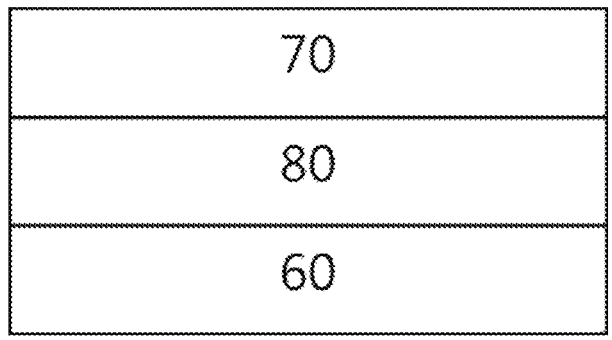

[Figure 16A]
<Present Invention>
Discotic Form ----------> Homeotropic Orientation in Discotic Form
[Figure 16B]
<Related Art>
Rod Form --------------> Homeotropic Orientation in Rod Form
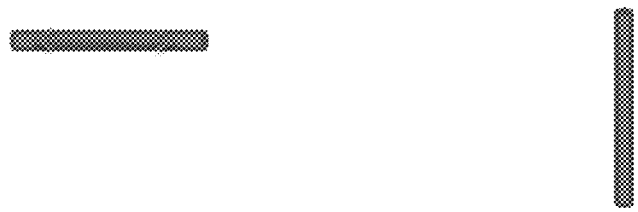

POLARIZING PLATE AND LIQUID CRYSTAL DISPLAY DEVICE COMPRISING SAME

The present application is a National Phase entry pursuant to 35 U.S.C. § 371 of International Application No. PCT/KR2018/013830 filed Nov. 13, 2018, and claims priority to and the benefit of Korean Patent Application No. 10-2017-0179581 filed in the Korean Intellectual Property Office on Dec. 26, 2017, the entire contents of which are incorporated herein by reference.

FIELD

The present application relates to a polarizing plate and a liquid crystal display device comprising the same.

BACKGROUND

Recently, as interest in information displays has been growing and the demand for using portable information media has been increasing, studies and commercialization of lightweight thin-film flat panel display (FPD) devices, which replace cathode ray tubes (CRTs) that are existing display devices, have been actively conducted. In particular, among FPD devices, a liquid crystal display (LCD) device is a device which expresses images by using optical anisotropy of liquid crystal molecules, and has been actively applied to notebook-sized computers, desktop monitors, and the like, due to the excellent resolution, color display, image quality, etc.

The liquid crystal display device is driven by two electrodes facing each other and a liquid crystal layer interposed therebetween, and liquid crystal molecules of the liquid crystal layer are driven by an electric field which is generated by applying a voltage to the two electrodes.

The liquid crystal molecules have polarization properties and optical anisotropy, the polarization property refers to a property wherein electric charges in liquid crystal molecules are concentrated onto both sides of the liquid crystal molecules when the liquid crystal modules are placed in an electric field, and accordingly an arrangement direction of the molecules changes according to the electric field. Optical anisotropy refers to changing a path or polarized state of emitted light according to an incident direction or polarized state of incident light based on a thin and long structure of the liquid crystal modules and the aforementioned arrangement direction of the molecules.

Accordingly, the liquid crystal display device comprises, as an essential constituting element, a liquid crystal panel composed of a pair of transparent insulating substrates with surfaces which face each other and a liquid crystal layer interposed therebetween, and further comprise electric field generating electrodes, respectively. The arrangement direction of the liquid crystal molecules is artificially adjusted by changing the electric field between the electric field generating electrodes, and various images are displayed using transmittance of light which changes during the adjustment of the arrangement direction.

In this case, polarizing plates are located on both upper and lower portions of the liquid crystal panel, respectively, and the polarizing plates determine a transmission degree of light according to disposition of transmission axes of the two polarizing plates and an arrangement characteristic of liquid crystals by allowing light of the polarizing component, which is aligned with the transmission axes to transmit therethrough.

A liquid crystal display device in the related art usually uses, as a polarizing plate, a PVA stretched polarizing plate in which iodine ions are stretched and then aligned in aqueous polyvinyl alcohol (PVA).

The present application has been made in an effort to provide a polarizing plate capable of performing a polarization function even at a viewing angle and a liquid crystal display device comprising the same.

SUMMARY

An exemplary embodiment of the present application provides a stacked polarizing plate comprising:
a polyvinyl alcohol-based polarizing plate comprising one or more of iodine and a dichroic dye; and
a film provided on one surface of the polyvinyl alcohol-based polarizing plate, the film comprising a lyotropic liquid crystal compound which absorbs light having a wavelength of 380 nm to 780 nm.

Further, another exemplary embodiment of the present application provides a method for manufacturing a stacked polarizing plate, the method comprising:
forming a film by coating a composition comprising a lyotropic liquid crystal compound which absorbs light having a wavelength of 380 nm to 780 nm onto a base material; and
attaching a polyvinyl alcohol-based polarizing plate comprising one or more of iodine and a dichroic dye onto the film.

Further, still another exemplary embodiment of the present application provides a liquid crystal display device comprising:
a liquid crystal panel; a first polarizing plate provided on one surface of the liquid crystal panel; and a second polarizing plate provided on another surface of the liquid crystal panel,
wherein at least one polarizing plate of the first polarizing plate and the second polarizing plate comprises the stacked polarizing plate described above.

In addition, yet another exemplary embodiment of the present application provides a method for manufacturing a liquid crystal display device, the method comprising: attaching a first polarizing plate to one surface of a liquid crystal panel, and attaching a second polarizing plate to another surface of the liquid crystal panel,
in which at least one polarizing plate of the first polarizing plate and the second polarizing plate comprises the stacked polarizing plate described above.

According to an exemplary embodiment of the present application, it is possible to provide a stacked polarizing plate comprising: a polyvinyl alcohol-based polarizing plate in which at least one or more of iodine and a dichroic dye is or are dyed; and a film provided on one surface of the polyvinyl alcohol-based polarizer and comprising a lyotropic liquid crystal compound which absorbs light with a wavelength of 380 nm to 780 nm.

According to an exemplary embodiment of the present application, at least one polarizing plate of a first polarizing plate and a second polarizing plate of a liquid crystal display device can comprise the stacked polarizing plate, thereby providing a liquid crystal display device capable of performing a polarization function even at a viewing angle.

BRIEF DESCRIPTION OF THE DRAWINGS

FIG. 1 is a view schematically illustrating a polarization function of a liquid crystal display device comprising a polarizing plate in the related art.

FIG. 2 is a view schematically illustrating the polarization function of a liquid crystal display device comprising a stacked polarizing plate according to an exemplary embodiment of the present application.

FIG. 3 is a view schematically illustrating a stacking structure of a liquid crystal display device according to Example 1 of the present application.

FIG. 4 is a view schematically illustrating a stacking structure of a liquid crystal display device according to Example 2 of the present application.

FIG. 5 is a view schematically illustrating a stacking structure of a liquid crystal display device according to Comparative Example 1 of the present application.

FIG. 6 is a view schematically illustrating a stacking structure of a liquid crystal display device according to Comparative Example 2 of the present application.

FIG. 7 is a view schematically illustrating a stacking structure of a liquid crystal display device according to Comparative Example 3 of the present application.

FIG. 8 is a view schematically illustrating a stacking structure of a liquid crystal display device according to Comparative Example 4 of the present application.

FIG. 9 is a view schematically illustrating a stacking structure of a liquid crystal display device according to Comparative Example 5 of the present application.

FIG. 10 is a view schematically illustrating a stacking structure of a liquid crystal display device according to Comparative Example 6 of the present application.

FIG. 11 is a view schematically illustrating a stacking structure of a liquid crystal display device according to Comparative Example 7 of the present application.

FIG. 12 is a view schematically illustrating a stacking structure of a liquid crystal display device according to Comparative Example 8 of the present application.

FIG. 13 is a view schematically illustrating a stacking structure of a liquid crystal display device according to Comparative Example 9 of the present application.

FIGS. 14 and 15 each are views schematically illustrating a stacked polarizing plate according to an exemplary embodiment of the present application.

FIGS. 16A and 16B are views schematically illustrating a homeotropic orientation in a discotic form according to an exemplary embodiment of the present application and the related art, respectively.

EXPLANATION OF REFERENCE NUMERALS AND SYMBOLS

10: Liquid crystal panel
20: Upper PVA-based polarizing plate
30: Lower PVA-based polarizing plate
40: Film comprising a lyotropic liquid crystal compound which is homeotropically oriented in a discotic form
50: Backlight unit
60: PVA-based polarizing plate
70: Base material
80: Lyotropic liquid crystal compound layer which is homeotropically oriented in a discotic form
90: Azo-based LLC film (does not absorb light with a wavelength of 380 nm to 780 nm)

DETAILED DESCRIPTION

Hereinafter, preferred exemplary embodiments of the present application will be described. However, the exemplary embodiments of the present application may be modified into various other forms, and the scope of the present application is not limited to the exemplary embodiments which will be described below. Further, the exemplary embodiments of the present application are provided to more fully explain the present application to a person with ordinary skill in the art.

When one part "comprises" one constituent element in the present specification, unless otherwise specifically described, this does not mean that another constituent element is excluded, but means that another constituent element may be further comprised.

A liquid crystal display (LCD) device has been used in various devices such as TVs, monitors, mobile phones, and tablet PCs. The performance of the liquid crystal display device is expressed by using a numerical value called a contrast ratio (CR) which indicates a ratio of white front luminance (On state) to black front luminance (Off state) as one numerical value exhibiting the performance. The higher the CR is, the better the performance of the device is evaluated.

However, the liquid crystal display device began to be applied to a field in which the liquid crystal display device had not been conventionally applied for the development of technology and human convenience, and an automotive liquid crystal display device, such as an automotive dashboard and a navigator, has been introduced. In the case of the automotive liquid crystal display device, the screen is viewed from the side rather than from the front in most cases in the existing liquid crystal display device (TV, a mobile phone, and the like). Accordingly, in the present application, a numerical value called Area CR for quantifying the performance of a liquid crystal display device at a viewing angle other than the front liquid crystal display device was introduced. In the present application, it is determined that the Area CR exhibits a CR at an upper 20 degrees and a lower 10 degrees at a viewing angle of 40 degrees.

However, a polyvinyl alcohol-based polarizing plate in the related art exhibited a performance in which the front CR is excellent, but the Area CR is not considerably good. In the case of the polarizing plate in the related art, the function of the polarizing plate at the abovementioned viewing angle is lost because the upper/lower polarizing plates form only the in-plane absorption axes (X & Y axes) of the display. Therefore, the present application intends to provide a polarizing plate capable of solving the above-described problem and performing the polarization function even at the abovementioned viewing angle, and a liquid crystal display device comprising the same.

A stacked polarizing plate according to an exemplary embodiment of the present application comprises: a polyvinyl alcohol-based polarizing plate comprising one or more of iodine and a dichroic dye; and a film provided on one surface of the polyvinyl alcohol-based polarizer and comprising a lyotropic liquid crystal compound which absorbs light with a wavelength of 380 nm to 780 nm.

Further, a liquid crystal display device according to an exemplary embodiment of the present application comprises a liquid crystal panel; a first polarizing plate provided on one surface of the liquid crystal panel; and a second polarizing plate provided on another surface of the liquid crystal panel, in which at least one of the first polarizing plate and the second polarizing plate comprises the stacked polarizing plate described above.

The stacked polarizing plate according to an exemplary embodiment of the present application intends to improve a low CR of the viewing angle of a polarizing plate in the related art used in a liquid crystal display device. More specifically, the polarizing plate in the related art has the in-plane absorption of only X & Y axes of the liquid crystal display device, whereas a stacked polarizing plate according to an exemplary embodiment of the present application is a polarizing plate which additionally has absorption of the Z axis in addition to the X & Y axes. When a polarizing plate having the absorption of the Z-axis is used, it is possible to obtain an effect in which the polarization in the cross state is maintained even at the abovementioned viewing angle.

The polarization function of a liquid crystal display device comprising a polarizing plate in the related art is schematically illustrated in the FIG. 1, and the polarization function of a liquid crystal display device comprising a stacked polarizing plate according to an exemplary embodiment of the present application is schematically illustrated in the FIG. 2. As in the following FIG. 1, the liquid crystal display device comprising the polarizing plate in the related art can obtain a polarization effect in the cross state on the front surface, but the cross state is collapsed at the viewing angle. However, as in FIG. 2, it can be seen that in a liquid crystal display device comprising a stacked polarizing plate according to an exemplary embodiment of the present application, by providing a stacked polarizing plate in a polarizing plate/polarizer 3, it is possible to obtain a polarization effect in the cross state even at the viewing angle in an absorption axis in the Z-axis direction compared to the related art.

In an exemplary embodiment of the present application, the lyotropic liquid crystal compound may be homeotropically oriented. In the present application, the homeotropic orientation refers to a film in which the optical axis is substantially perpendicular to the plane of the film. Further, the lyotropic liquid crystal compound may be a liquid crystal compound which is homeotropically oriented in a discotic form. The liquid crystals which are homeotropically oriented in a discotic form may form two absorption axes that absorb light in the y-axis direction which is one direction of the plane and absorb light in the z-axis direction which is perpendicular to the y axis.

The discotic form may be thought to be a coin shape and is a form in which the coins are homeotropically oriented, and accordingly, it is possible to have an absorption in one direction of the x axis and the y axis and the in-plane absorption of the coin. In an exemplary embodiment of the present application, when the lyotropic liquid crystal compound is not in the discotic form, that is, homeotropically oriented in a general+C plate (pencil shape), only the absorption of the z axis is exhibited, or the absorption of the x axis or the y axis is not exhibited.

A general homeotropic orientation in the related art and a homeotropic orientation in a discotic form according to an exemplary embodiment of the present application are schematically illustrated in FIGS. 16A and 16B, respectively. As in the following FIG. 16A, when the lyotropic liquid crystal compound is not in the discotic form, only one absorption axis of the x axis or y axis on the plane is present in a rod form, so that when the lyotropic liquid crystal compound is homeotropically oriented as a case where the lyotroic liquid crystal compound is not in the discotic form, only the absorption of the z axis is exhibited. In addition, as illustrated in FIG. 16B, in the case of the discotic form as an exemplary embodiment of the present application, the absorption axes of the x axis and the y axis on the plane and the z axis in the perpendicular direction are present, so that in the case of the homeotropic orientation in the discotic form, the absorption of the x axis, y axis, and z axis is exhibited.

In an exemplary embodiment of the present application, a film comprising the lyotropic liquid crystal compound may comprise a base material and a lyotropic liquid crystal compound layer provided on the base material. Further, an exemplary embodiment of the present application may additionally comprise an orientation layer between the base material and the lyotropic liquid crystal compound layer.

The base material may be composed of a transparent material such as glass or plastic or a transparent film. In addition, the orientation layer may comprise one or more of a polyimide-based material, a polyamide-based material, an acrylate-based material, a norbornene-based material, and the like, but the material is not limited thereto. The orientation layer may be formed on a base material by a method such as a bar coater, a slot die coater, gravure printing, silk screen printing, and a gap coater. As an orientation treatment such as light-orientation or rubbing is performed on the orientation layer, many micro grooves may be formed along a constant direction over the entire orientation layer.

In a film comprising the lyotropic liquid crystal compound, an acrylate-based hard coating layer may be provided on the lyotropic liquid crystal compound layer, or a protective film such as TAC, an acrylic protective film, COP and PET may be stacked on the coating layer in order to protect the lyotropic liquid crystal compound layer.

Furthermore, examples of the lyotropic liquid crystal compound comprise one or more of an azo-based compound, an anthraquinone-based compound, a perylene-based compound, a quinophthalone-based compound, a naphthoquinone-based compound, a merocyanine-based compound, and the like, but are not limited thereto. The lyotropic liquid crystal compound exhibits lyotropic liquid crystallinity, and may exhibit absorption dichroism, in a solution state.

In an exemplary embodiment of the present application, a lyotropic liquid crystal compound which absorbs light with a wavelength of 380 nm to 780 nm has a conjugation length in the molecule, which is longer than that of a lyotropic liquid crystal compound which does not absorb light with a wavelength of 380 nm to 780 nm, and as the conjugation length becomes longer, it is possible to absorb light with a longer wavelength.

A stacked polarizing plate according to an exemplary embodiment of the present application is schematically illustrated in FIGS. 14 and 15.

In an exemplary embodiment of the present application, the polyvinyl alcohol-based polarizing plate may comprise a protective film on at least one surface of a polyvinyl alcohol-based polarizer. Examples of the protective film comprise TAC, an acrylic protective film, COP, PET, and the like, but are not limited thereto.

Accordingly, the stacked polarizing plate according to an exemplary embodiment of the present application may have a structure such as: a hard coating layer/an LLC layer/a base material/TAC/PVA/TAC, TAC/an LLC layer/a base material/TAC/PVA/TAC, an LLC layer/a base material/TAC/PVA/TAC, a base material/an LLC layer/a hard coating layer/TAC/PVA/TAC, a base material/an LLC layer/TAC/PVA/TAC, a hard coating layer/an LLC layer/a base material/PVA/TAC, TAC/an LLC layer/a base material/PVA/TAC, an LLC layer/a base material/PVA/TAC, a base material/an LLC layer/a hard coating layer/PVA/TAC, and a base material/LLC/PVA/TAC, but the structure is not limited thereto.

A method for manufacturing a stacked polarizing plate according to an exemplary embodiment of the present application comprises: forming a film by coating a composition comprising a lyotropic liquid crystal compound which absorbs light having a wavelength of 380 nm to 780 nm onto a base material; and attaching a polyvinyl alcohol-based polarizing plate in which at least one or more of iodine and a dichroic dye is or are dyed onto the film. In this case, in the polyvinyl alcohol-based polarizing plate, a protective film may be bonded to at least one surface of the PVA by a water-based bonding agent or a UV bonding agent. Further, the protective film may be a film having a phase difference.

In addition, the liquid crystal panel and the first polarizing plate or the second polarizing plate may be attached to each other by using a water-based bonding agent or a UV-curable bonding agent, and may also be attached to each other by using a PSA adhesive agent.

Furthermore, a method for manufacturing a stacked polarizing plate according to another exemplary embodiment of the present application comprises: forming a film by coating a composition comprising a lyotropic liquid crystal compound which absorbs light having a wavelength of 380 nm to 780 nm onto a base material; preparing a polyvinyl alcohol-based polarizer comprising one or more of iodine and a dichroic dye; and attaching a film comprising the lyotropic liquid crystal compound to one surface of the polyvinyl alcohol-based polarizer, and attaching a protective film to another surface of the polyvinyl alcohol-based polarizer. In this case, the attaching process may be performed by using a water-based bonding agent or a UV-curable bonding agent, and may also be performed by using a PSA adhesive agent. Further, the protective film may be a film having a phase difference.

In an exemplary embodiment of the present application, the polyvinyl alcohol-based polarizer of the stacked polarizing plate may be provided between the liquid crystal panel and the film comprising the lyotropic liquid crystal compound. More specifically, the first polarizing plate comprises the stacked polarizing plate, and the second polarizing plate may be a polyvinyl alcohol-based polarizing plate comprising one or more of iodine or a dichroic dye. Further, the second polarizing plate comprises the stacked polarizing plate, and the first polarizing plate may be a polyvinyl alcohol-based polarizing plate comprising one or more of iodine or a dichroic dye.

In addition, both the first polarizing plate and the second polarizing plate may also comprise the stacked polarizing plate.

In an exemplary embodiment of the present application, as the polyvinyl alcohol-based polarizing plate comprising one or more of iodine and a dichroic dye, a general polyvinyl alcohol-based polarizing plate in the related art may be used.

As an example of the method for manufacturing a polyvinyl alcohol-based polarizing plate, it is possible to use a method comprising: preparing a polyvinyl alcohol-based polarizer comprising iodine and/or a dichroic dye, and stacking a protective film on one surface of the polarizer. For example, the method is not limited thereto, but the preparing of the polyvinyl alcohol-based polarizer may be carried out through dyeing a polyvinyl alcohol-based polymer film with iodine and/or a dichroic dye, cross-linking the polyvinyl alcohol-based film and the dye, and stretching the polyvinyl alcohol-based film.

First, the dyeing step is for dyeing an iodine molecule and/or a dichroic dye on a polyvinyl alcohol-based film, and the iodine molecule and/or the dichroic dye molecules may enable a polarization having a specific vibration direction to be obtained by absorbing light vibrating in a stretching direction of a polarizer and allowing light vibrating in a perpendicular direction to pass through. In this case, the dyeing may be carried out, for example, by impregnating a polyvinyl alcohol-based film in a processing bath containing an iodine solution and/or a solution containing a dichroic dye.

In this case, as a solvent used in the solution of the dyeing step, water is generally used, but an organic solvent having compatibility with water may be added in a suitable amount. Meanwhile, iodine and/or a dichroic dye may be used in an amount of 0.06 part by weight to 0.25 part by weight based on 100 parts by weight of the solvent. The reason is that when a dichroic material such as the iodine is used within the above range, the transmittance of a polarizer manufactured after stretching may satisfy a range of 40.0% to 47.0%.

Meanwhile, when iodine is used as a dichroic material, it is preferred to additionally contain an auxiliary agent such as an iodide compound in order to improve the dyeing efficiency, and the auxiliary agent may be used at a ratio of 0.3 part by weight to 2.5 parts by weight based on 100 parts by weight of the solvent. In this case, the reason for adding an auxiliary agent such as the iodide compound is for increasing the solubility of iodine to water because iodine has a low solubility to water. Meanwhile, the ratio of the iodine and the iodide compound blended is preferably 1:5 to 1:10 based on the weight.

In this case, specific examples of the iodide compound which may be added in the present application comprise potassium iodide, lithium iodide, sodium iodide, zinc iodide, aluminum iodide, lead iodide, copper iodide, barium iodide, calcium iodide, tin iodide, titanium iodide, or mixtures thereof, but are not limited thereto.

Meanwhile, it is preferred that the temperature of the processing bath is maintained at 25° C. to 40° C. When the temperature of the processing bath is less than 25° C., which is low, the dyeing efficiency may be dropped, and when the temperature is more than 40° C., which is too high of a temperature, a large amount of iodine is sublimed, so that the amount of iodine used may be increased.

In this case, the time for immersing a polyvinyl alcohol-based film in a processing bath is preferably 30 seconds to 120 seconds. The reason is that when the immersion time is less than 30 seconds, the polyvinyl alcohol-based film may not be uniformly dyed, and when the immersion time is more than 120 seconds, the dyeing is saturated, and as a result, the polyvinyl alcohol-based film need not be immersed any longer.

Meanwhile, the cross-linking step is for allowing iodine and/or a dichroic dye to be adsorbed onto a polyvinyl alcohol polymer matrix, a dipping method, which carries out the cross-linking by dipping a polyvinyl alcohol-based film in a cross-linking bath containing an aqueous boric acid solution, and the like, is generally used, but the method is not limited thereto, and the cross-linking step may also be carried out by an application method or a spray method in which a solution comprising a cross-linking agent is applied or sprayed onto a polyvinyl alcohol-based film.

In this case, as a solvent used in the solution of the cross-linking bath, water is generally used, but an organic solvent having compatibility with water may be added in a suitable amount, and the cross-linking agent may be added in an amount of 0.5 part by weight to 5.0 parts by weight based on 100 parts by weight of the solvent. In this case, when the cross-linking agent is contained in an amount of less than 0.5 part by weight, the cross-linking in the polyvinyl alcohol-based film is insufficient, so that the strength of the polyvinyl alcohol-based film may be decreased, and when the cross-linking agent is contained in an amount of more than 5.0 parts by weight, the cross-linking is excessively formed, so that the stretchability of the polyvinyl alcohol-based film may deteriorate. Further, specific examples of the cross-linking agent comprise boron compounds such as boric acid and sodium borate, glyoxal, glutaraldehyde, and the like, and these compounds may be used either alone or in combination thereof.

Meanwhile, the temperature of the cross-linking bath may vary depending on the amount of cross-linking agent and the stretching ratio, and is not limited to, but is generally preferably 45° C. to 60° C. In general, when the amount of cross-linking agent is increased, the temperature of a cross-linking bath is adjusted to a higher temperature condition in order to improve the mobility of polyvinyl alcohol-based film chains, and when the amount of cross-linking agent is small, the temperature of the cross-linking bath is adjusted to a relatively lower temperature condition. However, since the present invention is a process in which a stretching of 5 times or more is performed, the temperature of the cross-linking bath needs to be kept at 45° C. or more in order to improve the stretchability of the polyvinyl alcohol-based film. Meanwhile, the time for immersing a polyvinyl alcohol-based film in a cross-linking bath is preferably 30 seconds to 120 seconds. The reason is that when the immersion time is less than 30 seconds, the polyvinyl alcohol-based film may not be uniformly cross-linked, and when the immersion time is more than 120 seconds, the cross-linking is saturated, and as a result, the polyvinyl alcohol-based film need not be immersed any longer.

Meanwhile, in the stretching step, the stretching is for orienting polymer chains of the polyvinyl alcohol-based film in a constant direction, the stretching method may be divided into a wet stretching method and a dry stretching method, the dry stretching method is sub-divided into an inter-roll stretching method, a heating roll stretching method, a compression stretching method, a tenter stretching method, and the like, and the wet stretching method is sub-divided into a tenter stretching method, an inter-roll stretching method, and the like.

In this case, for the stretching step, it is preferred that the polyvinyl alcohol-based film is stretched at a stretching ratio of 4 times to 10 times. This is because polymer chains of the polyvinyl alcohol-based film needs to be oriented in order to impart polarization performance to the polyvinyl alcohol-based film, and the orientation of the chains may not sufficiently occur at a stretching ratio of less than 4 times and the chains of the polyvinyl alcohol-based film may be broken at a stretching ratio of more than 10 times.

In this case, it is preferred that the stretching is performed at a stretching temperature of 45° C. to 60° C. The stretching temperature may vary depending on the content of cross-linking agent, and the reason is that at a temperature of less than 45° C., the stretching efficiency may be reduced due to the deterioration in mobility of the polyvinyl alcohol-based film chains and when the stretching temperature is more than 60° C., the strength may be weak due to the softening of the polyvinyl alcohol-based film. Meanwhile, the stretching step may also be carried out simultaneously with or separately from the dyeing step or cross-linking step.

Meanwhile, the stretching may be performed by using a polyvinyl alcohol-based film alone, and may be performed by a method of stacking a base film on a polyvinyl alcohol-based film, and then stretching the polyvinyl alcohol-based film and the base film together. When a polyvinyl alcohol-based film having a small thickness (for example, a PVA film having a thickness of 60 μm or less) is stretched, the latter method is used in order to prevent the polyvinyl alcohol-based film from being ruptured during the stretching process, and the latter method may be used in order to manufacture a thin PVA polarizer having a thickness of 10 μm or less.

In this case, as the base film, polymer films having a maximum stretching ratio of 5 times or more under a temperature condition of 20° C. to 85° C. may be used, and for example, it is possible to use a high-density polyethylene film, a polyurethane film, a polypropylene film, a polyolefin film, an ester-based film, a low-density polyethylene film, a high-density polyethylene and low-density polyethylene co-extrusion film, a co-polymer resin film in which ethylene vinyl acetate is contained in a high-density polyethylene, an acrylic film, a polyethylene terephthalate film, a polyvinyl alcohol-based film, a cellulose-based film, and the like. Meanwhile, the maximum stretching ratio means a stretching ratio immediately before the rupture occurs.

Further, the method of stacking the base film and the polyvinyl alcohol-based film is not particularly limited. For example, the base film and the polyvinyl alcohol-based film may also be stacked through a bonding agent or an adhesive agent, and may also be stacked by a method of placing a polyvinyl alcohol-based film on a base film without a separate medium. Further, the stacking may be performed by a method of co-extruding a resin which forms a base film and a resin which forms a polyvinyl alcohol-based film, or a method of coating a polyvinyl alcohol-based resin onto a base film. Meanwhile, the base film may be removed by being separated from a polarizer when stretching is completed, but the next step may also be performed without removing the base film. In this case, the base film may be used as a polarizer protective film to be described below, and the like.

Next, when a polyvinyl alcohol-based polarizer is prepared through the aforementioned method, the stacking of the protective film on one surface of the polyvinyl alcohol-based polarizer is carried out.

In this case, the protective film is a film for protecting a polarizer having a very small thickness and refers to a transparent film which is attached to one surface of a polarizer, and it is possible to use a film which is excellent in mechanical strength, heat stability, moisture shielding property, isotropy, and the like. For example, it is possible to use an acetate-based resin film such as triacetyl cellulose (TAC), a polyester-based resin film, a polyether sulfone-based resin film, a polycarbonate-based resin film, a polyamide-based resin film, a polyimide-based resin film, a polyolefin-based resin film, a cycloolefin-based resin film, a polyurethane-based resin film, an acrylic resin film, and the like, but the film is not limited thereto.

Further, the protective film may be an isotropic film, may be an anisotropic film imparted with an optical compensation function such as phase difference, and may also be composed of one sheet or may also be an anisotropic film obtained by attaching two or more sheets. In addition, the protective film may be a film which is unstretched or stretched uniaxially or biaxially, and may have a thickness of generally 1 μm to 500 μm, and preferably 1 μm to 300 μm.

In this case, the bonding strength of the protective film to a polyvinyl alcohol-based polarizer may be preferably 1 N/cm$^2$ or more, and more preferably 2 N/cm$^2$ or more. Specifically, the bonding strength means a bonding strength measured as a 90 degree peeling strength by using a texture analyzer after attaching a protective film to a polyvinyl alcohol-based polarizer in which at least one or more of iodine and a dichroic dye is or are dyed. When the bonding strength satisfies the above range, it is possible to suppress the protective film and the polyvinyl alcohol-based polarizer from being swollen, and to minimize the occurrence of curling and defects during the manufacturing process.

Meanwhile, the stacking of the protective film on one surface of the polyvinyl alcohol-based polarizer is attaching the protective film to the polarizer, and the protective film may be attached to the polarizer by using a bonding agent. In this case, the stacking may be carried out through a method of laminating a film well-known in the art, and may be carried out by using a bonding agent well-known in the art, such as a water-based bonding agent such as a polyvinyl alcohol-based bonding agent, a thermosetting bonding agent such as a urethane-based bonding agent, a photo-cation curable bonding agent such as an epoxy-based bonding agent, and a photo radical curable bonding agent such as an acrylic bonding agent.

A liquid crystal display device according to an exemplary embodiment of the present application may additionally comprise a backlight unit. The backlight unit serves to supply light to a liquid crystal panel, and as a light source of the backlight unit, it is possible to apply one of a fluorescent lamp such as a cold cathode fluorescent lamp (CCFL), an external electrode fluorescent lamp (EEFL), and a hot cold fluorescent lamp (HCFL), or a light emitting diode (LED).

In an exemplary embodiment of the present application, the liquid crystal panel may be an in-plane switching (IPS) mode liquid crystal panel, a vertical alignment (VA) mode liquid crystal panel, a fringe field switching (FFS) mode liquid crystal panel, or a twisted nematic (TN) mode liquid crystal panel, but is not limited thereto.

Furthermore, other configurations constituting the liquid crystal display device, for example, the types of upper and lower substrates (for example, a color filter substrate or an array substrate) are also not particularly limited, and a configuration publicly-known in the art may be adopted without limitation.

Further, a method for manufacturing a liquid crystal display device according to an exemplary embodiment of the present application comprises: attaching a first polarizing plate to one surface of a liquid crystal panel, and attaching a second polarizing plate to another surface of the liquid crystal panel, in which at least one polarizing plate of the first polarizing plate and the second polarizing plate comprises the stacked polarizing plate.

In an exemplary embodiment of the present application, the method comprises attaching the stacked polarizing plate to the liquid crystal panel, in which the polyvinyl alcohol-based polarizing plate of the stacked polarizing plate may be attached so as to be provided between the liquid crystal panel and a film comprising the lyotropic liquid crystal compound.

EXAMPLES

Hereinafter, the present invention will be described in more detail through Examples. The following Examples are intended to aid in the understanding of the present invention, and the present invention is not limited thereby.

EXAMPLES

Example 1

After an LC cell of an LCD IPS navigation panel (model name LA080WV5) was prepared, a polarizing plate was adhered onto the LC cell by using an adhesive agent. The structure of a manufactured liquid crystal display device is as shown in FIG. 3. More specifically, the liquid crystal display device has a structure of an upper PVA-based polarizing plate/a liquid crystal panel/a lower PVA-based polarizing plate/a naphthoquinone-based LLC film (absorbs light having a wavelength of 380 nm to 780 nm).

Example 2

A process was carried out in the same manner as in Example 1, except that the structure of the liquid crystal display device was manufactured as illustrated in FIG. 4. More specifically, the liquid crystal display device has a structure of a naphthoquinone-based LLC film (absorbs light having a wavelength of 380 nm to 780 nm)/an upper PVA-based polarizing plate/a liquid crystal panel/a lower PVA-based polarizing plate.

Comparative Example 1

A process was carried out in the same manner as in Example 1, except that the structure of the liquid crystal display device was manufactured as illustrated in FIG. 5. More specifically, the liquid crystal display device has a structure of an upper PVA-based polarizing plate/a liquid crystal panel/a lower PVA-based polarizing plate.

Comparative Example 2

A process was carried out in the same manner as in Example 1, except that the structure of the liquid crystal display device was manufactured as illustrated in FIG. 6. More specifically, the liquid crystal display device has a structure of an upper PVA-based polarizing plate/a liquid crystal panel/a naphthoquinone-based LLC film (absorbs light having a wavelength of 380 nm to 780 nm).

Comparative Example 3

A process was carried out in the same manner as in Example 1, except that the structure of the liquid crystal display device was manufactured as illustrated in FIG. 7. More specifically, the liquid crystal display device has a structure of a naphthoquinone-based LLC film (absorbs light having a wavelength of 380 nm to 780 nm)/a liquid crystal panel/a lower PVA-based polarizing plate.

Comparative Example 4

A process was carried out in the same manner as in Example 1, except that the structure of the liquid crystal display device was manufactured as illustrated in FIG. 8. More specifically, the liquid crystal display device has a structure of an upper PVA-based polarizing plate/a liquid crystal panel/a lower PVA-based polarizing plate/a lower PVA-based polarizing plate.

Comparative Example 5

A process was carried out in the same manner as in Example 1, except that the structure of the liquid crystal display device was manufactured as illustrated in FIG. 9. More specifically, the liquid crystal display device has a structure of an upper PVA-based polarizing plate/an upper PVA-based polarizing plate/a liquid crystal panel/a lower PVA-based polarizing plate.

Comparative Example 6

A process was carried out in the same manner as in Example 1, except that the structure of the liquid crystal display device was manufactured as illustrated in FIG. 10. More specifically, the liquid crystal display device has a structure of an upper PVA-based polarizing plate/a liquid crystal panel/a lower PVA-based polarizing plate/a lower PVA-based polarizing plate/a lower PVA-based polarizing plate.

Comparative Example 7

A process was carried out in the same manner as in Example 1, except that the structure of the liquid crystal display device was manufactured as illustrated in FIG. 11. More specifically, the liquid crystal display device has a structure of an upper PVA-based polarizing plate/an upper PVA-based polarizing plate/an upper PVA-based polarizing plate/a liquid crystal panel/a lower PVA-based polarizing plate.

Comparative Example 8

A process was carried out in the same manner as in Example 1, except that the structure of the liquid crystal display device was manufactured as illustrated in FIG. 12. More specifically, the liquid crystal display device has a structure of an upper PVA-based polarizing plate/a liquid crystal panel/a lower PVA-based polarizing plate/an azo-based LLC film (does not absorb light having a wavelength of 380 nm to 780 nm, an azo-based LLC manufactured by LGC Ltd.).

Comparative Example 9

A process was carried out in the same manner as in Example 1, except that the structure of the liquid crystal display device was manufactured as illustrated in FIG. 13. More specifically, the liquid crystal display device has a structure of an azo-based LLC film (does not absorb light having a wavelength of 380 nm to 780 nm, an azo-based LLC manufactured by LGC Ltd.)/an upper PVA-based polarizing plate/a liquid crystal panel/a lower PVA-based polarizing plate.

Experimental Examples

Physical properties of the liquid crystal display devices in the Examples and the Comparative Examples were evaluated, and are shown in the following Table 1.

Used upper/lower POL mineral properties: Ts 42.5%, DOP 99.995% LLC mineral properties used in Examples 1 and 2—DR 20, Ts 70%(1), 42.5%(2), 30%(3)

LLC mineral properties used in Comparative Examples 2 and 3—DR 20, Ts 42.5%

Apparatus of evaluating mineral properties (Ts, DOP, DR, and the like): JASCO (v7100)

TABLE 1

|  |  | Front surface | | | Upward 20 degrees | | | Downward 10 degrees | | |
|---|---|---|---|---|---|---|---|---|---|---|
|  |  | Lw ($cd/m^2$) | Lb ($cd/m^2$) | CR | Lw ($cd/m^2$) | Lb ($cd/m^2$) | CR | Lw ($cd/m^2$) | Lb ($cd/m^2$) | CR |
| Example 1 | (1) | 430 | 0.29 | 1483 | 250 | 0.4 | 625 | 270 | 0.43 | 628 |
|  | (2) | 410 | 0.27 | 1519 | 230 | 0.36 | 639 | 250 | 0.4 | 625 |
|  | (3) | 390 | 0.26 | 1500 | 220 | 0.35 | 629 | 240 | 0.4 | 600 |
| Example 2 | (1) | 430 | 0.29 | 1483 | 250 | 0.4 | 625 | 270 | 0.43 | 628 |
|  | (2) | 410 | 0.27 | 1519 | 230 | 0.37 | 622 | 250 | 0.4 | 625 |
|  | (3) | 370 | 0.25 | 1480 | 220 | 0.37 | 595 | 240 | 0.39 | 615 |
| Comparative Example 1 |  | 450 | 0.3 | 1500 | 270 | 0.6 | 450 | 300 | 0.62 | 484 |
| Comparative Example 2 |  | 450 | 0.51 | 882 | 260 | 0.65 | 400 | 280 | 0.64 | 438 |
| Comparative Example 3 |  | 450 | 0.52 | 865 | 260 | 0.66 | 394 | 280 | 0.65 | 431 |
| Comparative Example 4 |  | 410 | 0.31 | 1323 | 260 | 0.6 | 433 | 280 | 0.6 | 467 |
| Comparative Example 5 |  | 410 | 0.31 | 1323 | 260 | 0.6 | 433 | 280 | 0.61 | 459 |
| Comparative Example 6 |  | 380 | 0.3 | 1267 | 240 | 0.6 | 400 | 260 | 0.59 | 441 |
| Comparative Example 7 |  | 380 | 0.3 | 1267 | 240 | 0.6 | 400 | 260 | 0.6 | 433 |
| Comparative Example 8 |  | 430 | 0.3 | 1433 | 260 | 0.7 | 371 | 290 | 0.64 | 453 |
| Comparative Example 9 |  | 430 | 0.32 | 1344 | 260 | 0.7 | 371 | 290 | 0.65 | 446 |

In the Examples, the front CRs were similar to those in the Comparative Examples, and in the case of the Area CR (viewing angle 40 degrees, upward 20 degrees, and downward 10 degrees), the Examples exhibited remarkably good CRs as compared to the Comparative Examples (improved by about 30%). Comparative Examples 4 to 7 were carried out in order to determine whether the effects according to the thickness direction of LLC could be implemented by several sheets of PVA-based polarizing plates.

As in the above result, according to an exemplary embodiment of the present application, at least one polarizing plate of a first polarizing plate and a second polarizing plate of a liquid crystal display device can comprise the stacked polarizing plate, thereby providing a liquid crystal display device capable of performing a polarization function even at a viewing angle.

The invention claimed is:

1. A liquid crystal display device comprising:
    a liquid crystal panel;
    a first polarizing plate attached to one surface of the liquid crystal panel; and
    a second polarizing plate attached to another surface of the liquid crystal panel,
    wherein at least one of the first polarizing plate and the second polarizing plate comprises a polyvinyl alcohol-based polarizing plate comprising one or more of iodine and a dichroic dye; and a film attached to one surface of the at least polyvinyl alcohol-based polarizing plate and comprising a lyotropic liquid crystal compound which absorbs light having a wavelength of 380 nm to 780 nm, and
    wherein the at least polyvinyl alcohol-based polarizing plate is provided between the liquid crystal panel and the film comprising the lyotropic liquid crystal compound.

2. The liquid crystal display device of claim 1, wherein one of the first polarizing plate and the second polarizing plate comprises the polyvinyl alcohol-based polarizing plate and the film comprising the lyotropic liquid crystal compound, and the other polarizing plate is a polyvinyl alcohol-based polarizing plate comprising one or more of iodine and a dichroic dye.

3. The liquid crystal display device of claim 1, wherein both the first polarizing plate and the second polarizing plate comprise the polyvinyl alcohol-based polarizing plate and the film comprising the lyotropic liquid crystal compound.

4. The liquid crystal display device of claim 1, wherein the liquid crystal panel is an in-plane switching (IPS) mode liquid crystal panel, a vertical alignment (VA) mode liquid crystal panel, a fringe field switching (FFS) mode liquid crystal panel, or a twisted nematic (TN) mode liquid crystal panel.

5. The liquid crystal display device of claim 1, wherein the lyotropic liquid crystal compound is homeotropically oriented in a discotic form.

6. A method for manufacturing a liquid crystal display device, the method comprising:
    attaching a first polarizing plate to one surface of a liquid crystal panel, and
    attaching a second polarizing plate to another surface of the liquid crystal panel,
    wherein at least one of the first polarizing plate and the second polarizing plate comprises a polyvinyl alcohol-based polarizing plate comprising one or more of iodine and a dichroic dye; and a film attached to one surface of the at least polyvinyl alcohol-based polarizing plate and comprising a lyotropic liquid crystal compound which absorbs light having a wavelength of 380 nm to 780 nm, and
    wherein the at least polyvinyl alcohol-based polarizing plate is provided between the liquid crystal panel and the film comprising the lyotropic liquid crystal compound.

7. The method of claim 6, wherein the lyotropic liquid crystal compound is homeotropically oriented in a discotic form.

* * * * *